Figures 1, 2, 3:
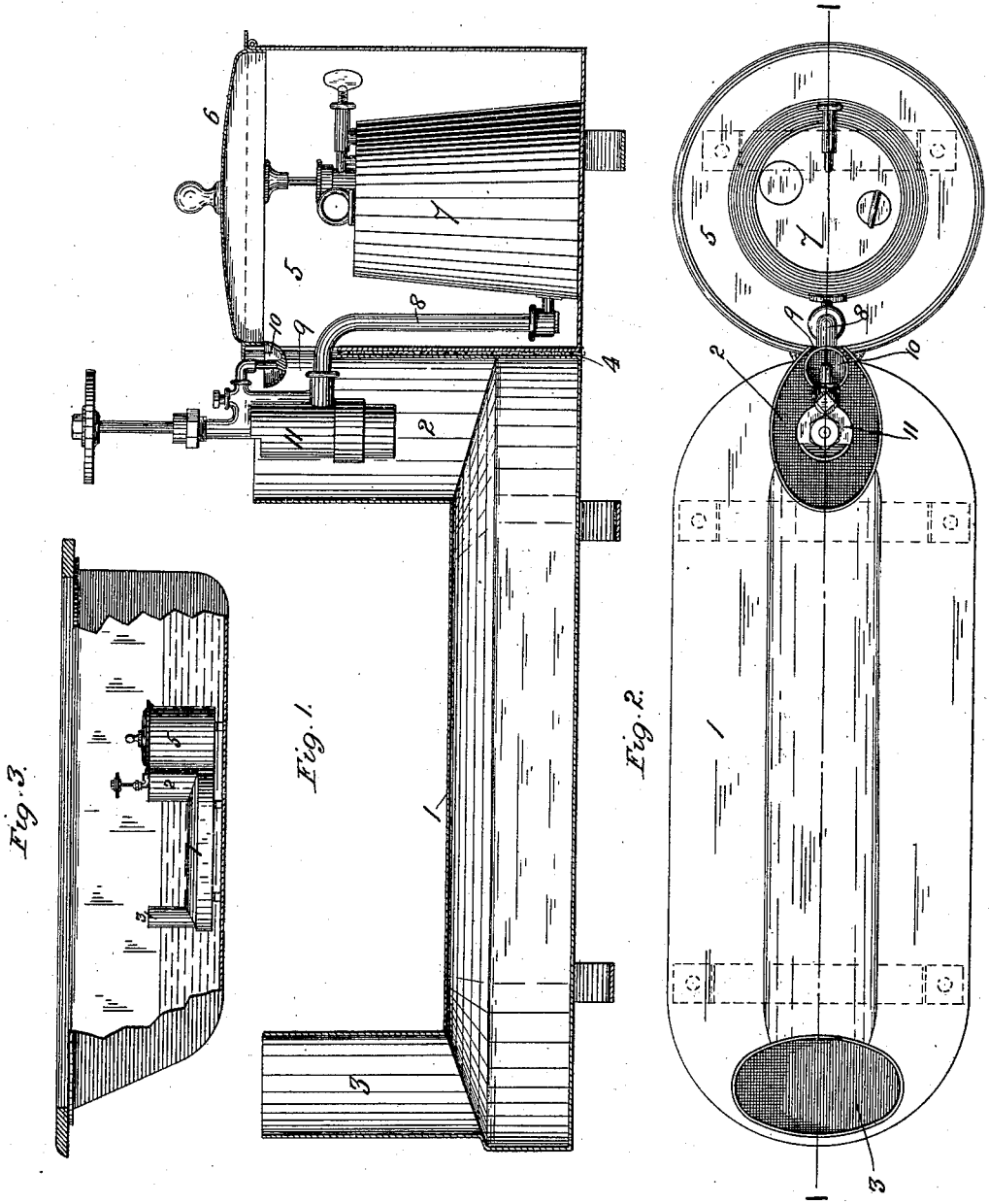

No. 664,439. Patented Dec. 25, 1900.
F. SCHIFFERLE.
WATER HEATER.
(Application filed June 7, 1900.)
(No Model.)

WITNESSES
Edward W. Currell
G. L. Belfry.

INVENTOR,
Fridolin Schifferle
by Emil Starek, atty.

UNITED STATES PATENT OFFICE.

FRIDOLIN SCHIFFERLE, OF ST. LOUIS, MISSOURI.

WATER-HEATER.

SPECIFICATION forming part of Letters Patent No. 664,439, dated December 25, 1900.

Application filed June 7, 1900. Serial No. 19,423. (No model.)

*To all whom it may concern:*

Be it known that I, FRIDOLIN SCHIFFERLE, a citizen of the United States, residing at St. Louis, in the State of Missouri, have invented certain new and useful Improvements in Water-Heaters, of which the following is a full, clear, and exact description, reference being had to the accompanying drawings, forming a part hereof.

My invention has relation to improvements in water-heaters; and it consists in the novel arrangement and combination of parts more fully set forth in the specification and pointed out in the claim.

In the drawings, Figure 1 is a middle vertical section taken through the casing or drum on line 1 1 of Fig. 2, the burner being shown in elevation. Fig. 2 is a top plan view with the cover of the compartment in which the oil-receptacle is placed removed; and Fig. 3 is a side elevation of the device submerged in a bath-tub, the walls of the latter being broken away.

The present invention is an improvement on the water-heater for which Letters Patent of the United States were issued to me under date of May 8, 1900, numbered 649,111, and has for its object to materially simplify the construction therein shown and described, with a view also to minimize the time within which a given quantity of water may be heated. In detail the invention may be described as follows:

Referring to the drawings, 1 represents a casing or drum having a dome-shaped top and provided at one end with an air-inlet flue 2 and at the other with an escape-flue 3. Located at the end of the casing and secured thereto by solder 4 or in any mechanical manner is a compartment or chamber 5, provided with a cover 6 and designed to receive an ordinary gasolene blower-lamp 7, the feed-pipe 8 thereof extending upward from the bottom and terminating in an elbow, for the reception of which the terminal wall of the casing is cut away at 9, the said recess or cut-away portion being of sufficient width to allow for the accommodation of the cup 10, carried by the burner 11, the cup being intended, as is well known, to hold an initial quantity of alcohol, which upon ignition heats the burner sufficiently to vaporize the gasolene fed thereto in starting the flame. The flame shoots down into the flue 2, the currents of air being induced thereinto, thereby producing perfect combustion, the products of combustion filling the drum and finally escaping through the flue 3. The top of the drum is made dome-shaped in order that the products of combustion may properly be reverberated within the drum and the walls thereof heated in a minimum amount of time.

Like in my patented construction referred to the heater as a whole is partially submerged in water, the heater being specially applicable for bath-tubs and the like.

It is apparent that I may make slight changes in the construction without departing from the spirit of my invention.

Having described my invention, what I claim is—

A water-heater comprising a suitable drum or casing having a dome-shaped top, an air-inlet flue and an escape-flue, a compartment located at one end of the drum adjacent to the air-inlet flue, a hydrocarbon-lamp located within the same, a pipe leading therefrom and passed through a recess in the adjacent wall of the casing, a burner at the end of said pipe confined within the air-inlet flue, and adapted to direct its flame into the chamber of the casing, the parts operating substantially as, and for the purpose set forth.

In testimony whereof I affix my signature in presence of two witnesses.

FRIDOLIN SCHIFFERLE.

Witnesses:
 EMIL STAREK,
 G. L. BELFRY.